United States Patent

[11] 3,579,068

[72] Inventor Teh C. Tschang
    Springfield, N.J.
[21] Appl. No. 712,217
[22] Filed Mar. 11, 1968
[45] Patented May 18, 1971
[73] Assignee Air Reduction Company, Incorporated,
    New York, N.Y.

[54] SERVO CONTROLLED HEIGHT CONTROL
    15 Claims, 7 Drawing Figs.
[52] U.S. Cl. .................................................. 318/478,
    318/645, 219/125
[51] Int. Cl. ...................................................... G05d 16/00
[50] Field of Search .......................................... 219/125;
    318/478, 20.630

[56] References Cited
UNITED STATES PATENTS
3,426,175 2/1969 Hahne.......................... 219/125

Primary Examiner—T. E. Lynch
Attorneys—Larry R. Cassett, Edmund W. Bopp and H. Hume Mathews ABSTRACT: A height control unit for maintaining the desired distance between a tool and a substantially flat workpiece on which the tool is working. The control system utilizes fluidic circuitry to measure the reflected pressure of jets of gas directed at the workpiece. The fluidic circuitry develops a signal in response to the reflected pressure which results in the raising or lowering of the tool.

INVENTOR
TEH C. TSCHANG

BY
Larry R. Cassett
ATTORNEY

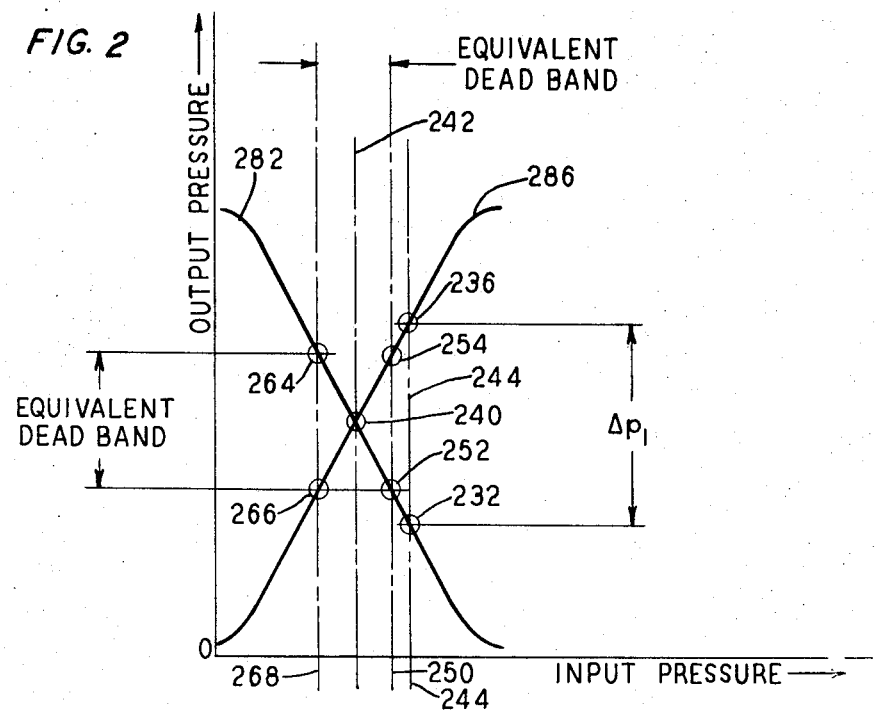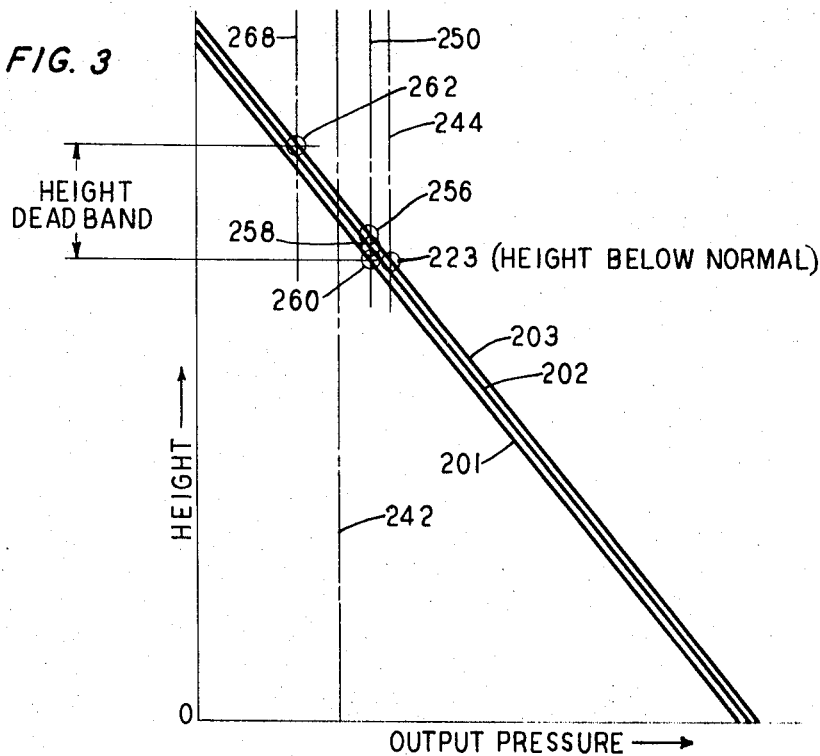

Patented May 18, 1971
3,579,068
3 Sheets-Sheet 3
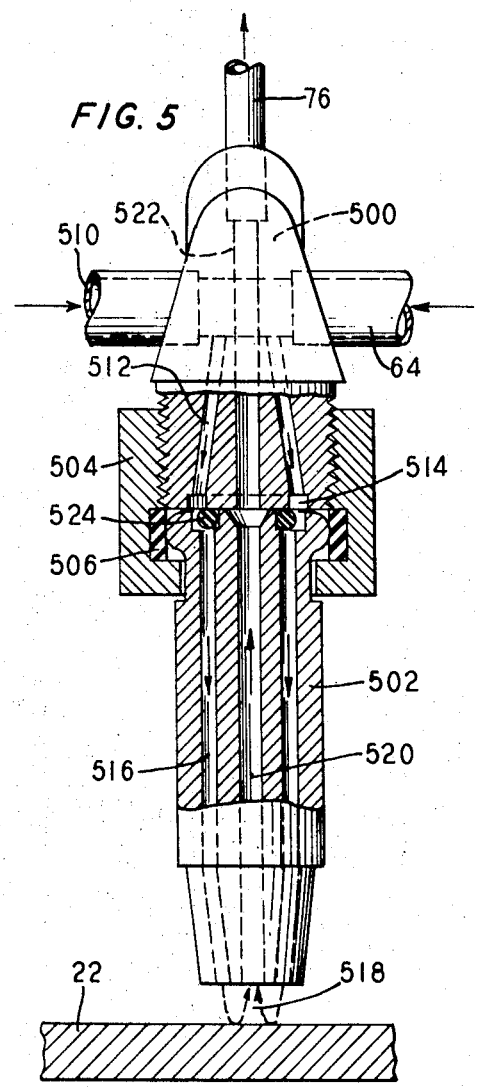
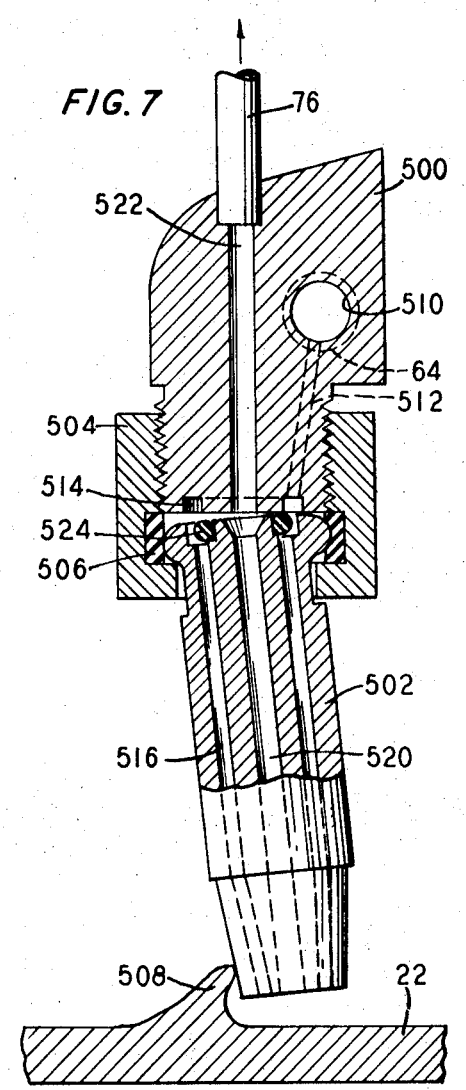
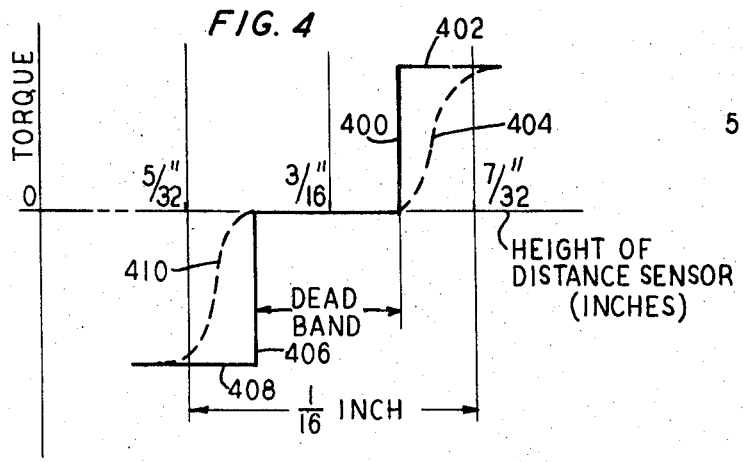
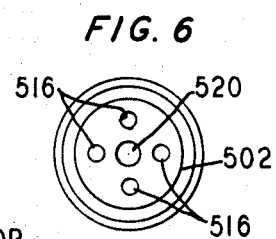
INVENTOR
TEH C. TSCHANG
BY Jerry R. Cassett
ATTORNEY 3,579,068

SERVO CONTROLLED HEIGHT CONTROL

BACKGROUND OF THE INVENTION

1. Field of the Invention

The invention relates to means and methods for sensing the spacing between two bodies such as a tool and a workpiece and for using a signal which represents the sensed spacing to maintain the said spacing at a desired value.

2. Description of the Prior Art

Fluidic devices have been used within the field of the invention for the purpose of generating control signals for raising and lowering a tool, however such devices have required the use of one sensor to control the raising of the tool and a separate sensor to control the lowering of the tool.

Other height control systems have been used which used electronic sensors or which mechanically felt the height. However each of these also have serious limitations which make them objectionable for many applications.

SUMMARY OF THE INVENTION

The invention accomplishes the control of the spacing between a tool and a surface of a workpiece through the application of fluidic principles. A fluidic sensor device is attached to the tool and positioned over the workpiece so as to develop a signal, the magnitude of which is substantially inversely proportional to the distance between the sensor and the workpiece.

This fluidic signal is then amplified by a fluidic amplifier for use in actuating a mechanism which will either lower or raise the tool depending upon the magnitude of the signal.

The use of a durable fluidic device as a sensor overcomes many of the problems associated with the use of electronic devices which are sensitive to the destructive type environment common to many applications for such devices.

It is a primary purpose of this invention to provide a height control system which is not as sensitive to temperature as electronic devices and yet does not require any actual contact with the workpiece.

BRIEF DESCRIPTION OF THE DRAWING

FIGS. 2 and 3 are graphs useful in explaining the operation of the fluidic components shown schematically in FIG. 1;

FIG. 4 is a graph of motor torque versus height of distance sensor above workpiece;

FIG. 5 is an elevational view, partly in section, of a distance sensor head and distance sensor tip;

FIG. 6 is an end view of the distance sensor tip shown in elevation in FIG. 5; and FIG. 7 is an elevational view, partly in section, of the distance sensor head and distance sensor tip of FIG. 5, showing the tip deflected with reference to the head as by an obstruction on the surface of a workpiece.

DESCRIPTION OF THE PREFERRED EMBODIMENT

Figure 1:
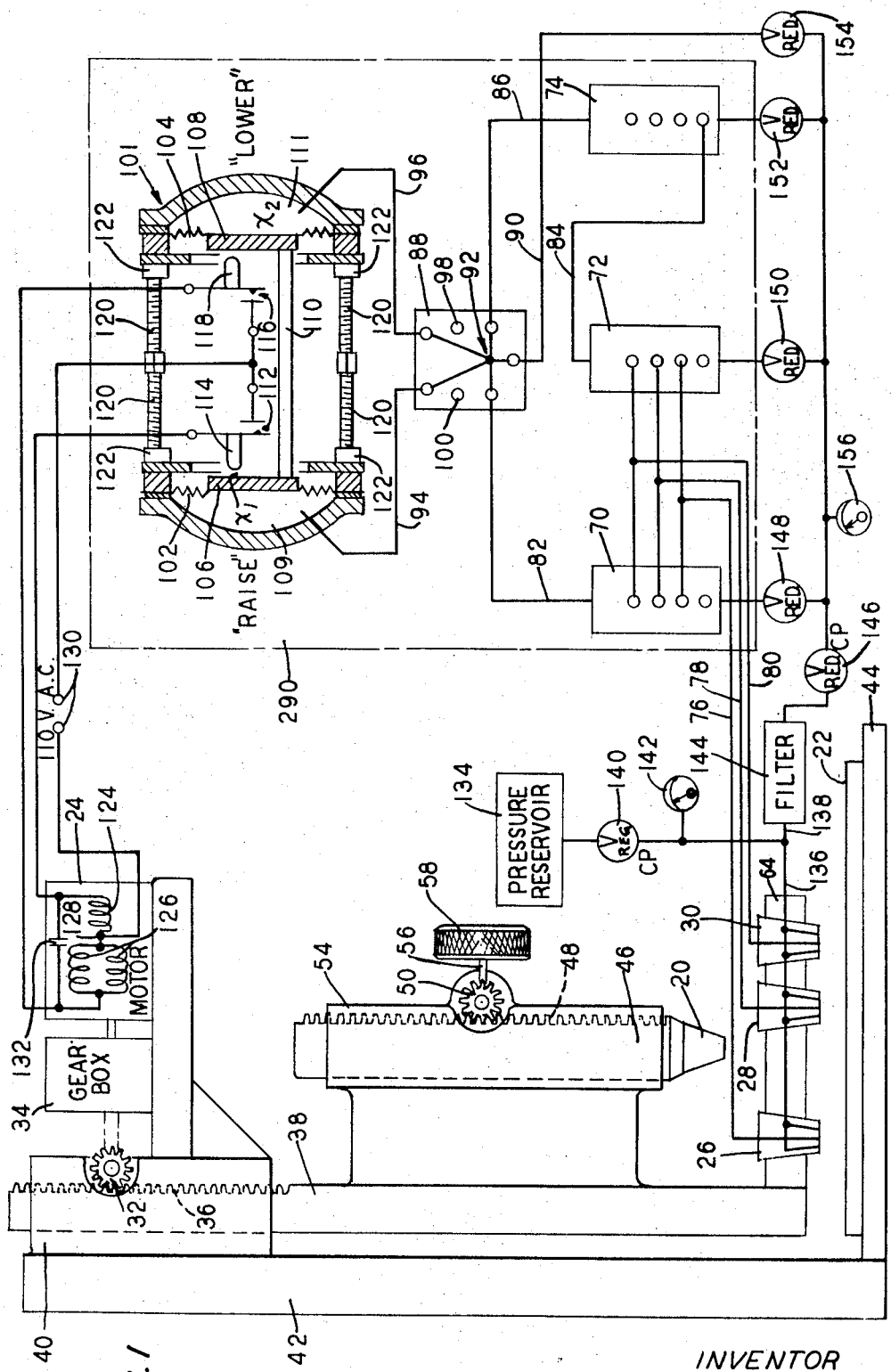
FIG. 1 is a combined fluidic and electric schematic drawing of a distance control system in accordance with the invention.

Referring to the drawings, a tool 20 is arranged to be either raised or lowered with respect to the surface of a workpiece 22 by means of a reversible motor 24 actuated in response to signals generated by a plurality of distance sensors 26, 28, 30 in order to maintain substantially constant the spacing between the tool and the workpiece surface.

The motor 24 drives a pinion 32 through a gearbox 34, which pinion in turn drives a rack 36 attached to or integral with a supporting column 38. The pinion 32 is housed within a collar 40 within which the column 38 is slidably mounted. The collar 40, gearbox 34 and motor 24 are supported as a unit by a stanchion 42 which in turn is supported upon a base plate 44 upon which the workpiece 22 rests.

The tool 20 is attached to the base of a tool holder 46 which latter carries a rack 48 attached thereto or integral therewith. The rack 48 meshes with a pinion 50 mounted in a collar 54 in which the tool holder 46 is slidably mounted. The collar 54 is rigidly attached to the column 38 near the base of the column so that the tool is made movable by the motor 24. The pinion 50 can be turned manually by means of a shaft 56 and a knurled knob 58 whereby the knob 58 can be used to adjust the spacing between the tool 20 and the workpiece 22 at any height of the column 38. A fluidic manifold 64 is attached to or integral with the column 38 and carries the sensors 26, 28, 30.

The tool 20 and workpiece 22 may be of any suitable kinds designed to cooperate for any desired purpose; however, to make the disclosure of the invention more definite, the invention will be described with particular reference to a gaseous flame cutting torch for cutting metal plates.

Accordingly, the tool 20 may be a cutting torch of any suitable design, for example, one comprising a tapered brass or bronze torch tip similar in structure to the sensor tip 502 (FIG. 5), having a central hole 520 to which is supplied a stream of cutting oxygen, and peripheral spaced holes 516 slanting toward the central axis of the tip and supplied with fuel gas or a mixture of fuel gas and oxygen in advantageous proportion.

In the embodiment illustrated herein, the sensors 26, 28, 30 are substantially identical with the tool 20, except that they are arranged to be supplied with any suitable pressurized gas (air, oxygen or other gas) through the peripheral holes 516, forming a group of converging streams which upon striking the surface of the workpiece 22 are reflected upward approximately along the central axis of the sensor, tending to enter the central hole and produce pressure therein. The pressure created in the central hole increases as the sensor is made to approach closer to the workpiece surface and decreases as the sensor is separated farther from that surface. If the sensor to surface distance increases greatly, as when the sensor runs off the edge of the workpiece, the back pressure in the central hole can become very small or there may even be a slight suction created by the asperating effect of the issuing streams upon the central passage. The pressure variation in the sensor is utilized as a control signal to control the motor 24 to move the tool with respect to the workpiece in such manner as to maintain the tool to workpiece spacing essentially constant.

It will be evident that if a single sensor were relied upon and the sensor should run off the edge of the workpiece, the apparent distance sensed would probably greatly increase, thereby calling for a lowering of the tool. If the tool is still over the workpiece, it may be driven forcefully into the workpiece unless special precaution is taken. To avoid this result, I use a plurality of sensors, in an array surrounding the tool as a center in order that at least one sensor shall be over the workpiece at all times. I find that it is sufficient to use three sensors located on a circumference of a circle having either a fixed or adjustable diameter surrounding the tool and spaced perfectly at equal angles about the circumference.

The several pressure signals from the individual sensors are impressed upon a device such as an OR element which can be adjusted to respond to one such signal alone, or to one or more such signals. In the case of more than one signal the OR element exhibits a saturation effect whereby two input signals produce a response which differs only slightly from the response due to one input alone, and successive additional signals produce only slight or insignificant changes in the output. It is particularly desirable for the purposes of the invention that the OR element respond essentially to the largest pressure signal in order that the tool will be raised if the workpiece approaches too close to any one of the sensors.

For the above purposes, I find that a turbulence amplifier with high input impedance is admirably suitable as the OR element.

The turbulence amplifier is a fluidic device in which a jet of moving gas is emitted from an orifice into a protecting chamber at such a velocity that the stream is laminar as it emerges and remains laminar over a distance of about an inch before becoming turbulent. An output tube is mounted in such a position as to receive the laminar stream and transmit the pressure therefrom through the output tube to some other utilization device. One or more side tubes, known as input tubes are provided in such position that a stream from any input tube can interfere with the laminar stream to cause more or less turbulence therein before the stream reaches the output tube.

The interfering stream may be of much less pressure than the laminar stream as it takes very little energy to upset the laminar flow and it has been observed that the relationship between the output pressure of the turbulence amplifier and the input pressure at the input tubes is a substantially linear inverse one for a considerable region. It has also been observed that the cumulative effect of two or more input streams reduces the output pressure only slightly below the output pressure observed with one input alone and the input stream having the highest pressure has the dominant effect on the output pressure.

The drawing shows two turbulence amplifiers 70, 72 arranged to detect pressure signals from the sensors 26, 28, 30, and to provide push-pull signals governed by the pressure responses of all three sensors. The output of amplifier 72 is connected to an input of a third turbulence amplifier 74. The turbulence amplifiers 70 and 74 use relatively high supply pressure and for that reason are called high pressure turbulence amplifiers, while the amplifier 72 is designed to use a lower supply pressure for generating a laminar stream and is called a low pressure turbulence amplifier. The low pressure turbulence amplifier has about one-half the power output of the high pressure turbulence amplifier. In each of the amplifiers 70, 72, 74, the laminar stream passes through the amplifier from bottom to top in the drawing, along the central axis of the respective amplifier. Each amplifier is shown with four inputs, indicated by small circles, not all of which inputs are used in this embodiment of the invention.

The pressure signal from the sensor 26 is transmitted through a branched tube 76 to the next to bottom input in both amplifiers 70 and 72. Similar tubes 78 and 80 transmit the pressure signal from the sensors 28 and 30 to other inputs in both amplifiers 70 and 72.

The output pressure signal from the amplifier 70 appears in a tube 82, which output signal is relatively strong. A relatively weak output signal generated in the amplifier 72 appears in a tube 84, the output of amplifier 72 being connected to one of the input tubes of the amplifier 74 to produce a relatively strong output signal in a tube 86, which is comparable to the signal that appears in tube 82. It will be noted that an increase in the pressure in tube 76 causes increased turbulence in amplifiers 70 and 72, thereby decreasing the output pressure in tubes 82 and 84. The decreased pressure in tube 84, impressed upon an input of amplifier 74 decreases the turbulence in amplifier 74, thereby increasing the pressure in tube 86. Thus a pressure change in sensor 26 produces pressure changes of opposite sense in tubes 82 and 86, which changes can be adjusted to substantially equal amplitude thus providing signals of equal amplitude and opposite sense as known to be required for push-pull operation of a suitable push-pull amplifier. Alternatively, a geometrically biased push-pull amplifier can be used to eliminate the necessity of adjusting and balancing the push-pull input signals in tubes 82 and 86.

To serve as a push-pull amplifier, a fluidic device 88 is provided, which is supplied with a central stream of gas which can be deflected to one side or the other by means of relatively weak control streams arranged to impinge upon the main stream on opposite sides. Normally the main stream is undeflected, and it remains undeflected if opposing streams of equal strength are applied to the main stream on the two opposite sides. The stream may be deflected to one side by weakening the side stream coming from that side and strengthening the side stream coming from the other side. The relative weakness of the side streams effects a control of the main stream with a resultant amplification, whereby a small pressure change in the side streams results in the desired deflection of the main stream.

The main stream enters the amplifier 88 by way of a tube 90 and is impinged by the side streams from the tubes 82, 86 at a point represented schematically at 92, the output stream appearing in a tube 96 if deflected to the right in the drawing, or in a tube 94 if deflected to the left. Pressure may be relieved or bled from the stream deflected to the right through a vent 98 and from the stream deflected to the left through a vent 100.

The above mentioned active fluidic elements are shown in FIG. 1 to be discrete elements, although integrated turbulence amplifier blocks and/or integrated turbulence amplifier and proportional fluidic elements may be substituted.

To translate from fluidic pressure to electric current it is desirable to employ a push-pull operable fluidic-to-electronic transducer. For this purpose, I have designed a unique device which combines two diaphragm actuated electric switches in a unitary device by mounting the thrust plates of the two diaphragms at opposite ends of a push rod while supporting the edges of the respective diaphragms at a fixed, although adjustable, spacing.

Such a device is illustrated schematically at 101 in the drawing, in which two diaphragms 102, 104 having thrust plates 106 and 108 respectively, rigidly connected by a rod 110. The tube 94 is connected to the cavity 109 bounded by the diaphragm 102, and the tube 96 is connected to the cavity 111 bounded by the diaphragm 104, whereby the pressure differences in the respective tubes provide push-pull motion of the rod 110. The electric switch 112 is mounted adjacent to the thrust plate 106 so that the contacts of the switch 112 may be closed when a button 114 is moved to the right by the thrust plate 106 as viewed in the drawing. A certain pressure upon the diaphragm 102 is required to stretch the diaphragm sufficiently to close the switch 112 and the switch remains closed until the pressure upon the diaphragm is reduced a certain amount below the pressure required for closing the switch. A similar combination of a switch 116 and a button 118 is provided to be operated by the thrust plate 108 in similar fashion. After reopening of the switch 112, a certain further reduction of pressure upon the diaphragm 102 is required to close the switch 116 and a certain increase in pressure upon the diaphragm 102 is required to reopen switch 116. It is evident that increase in pressure upon the diaphragm 102 is, due to the push-pull operation of the device, accompanied by decrease in pressure upon the diaphragm 104 and vice versa.

Suitable means, such as screws 120 and nuts 122 may be provided to control the separation between the diaphragms 102 and 104 in order to adjust them for minimum initial stretching.

The switches 112, 116 control the supply of current to the reversible motor 24 to raise and lower the tool and sensors with reference to the workpiece. Switch 112 controls the raising operation and switch 116 controls the lowering. The motor 24 is of a type having separate windings for operating in the two directions of rotation, a winding 124 being provided for upward motion and a winding or windings 126 for downward motion. The windings have a common junction 128 to which is connected one side of a suitable power supply, such as a 110 volt alternating current supply line 130, the other side of which is connected in common to one contact of each of the switches 112, 116. A capacitor 132 is shown connected across the series combination of the windings 124 and 126.

It will be noted that the connections of the control system are such that when the sensors approach closer to the workpiece, the system acts to raise the tool and sensors, and when the sensors increase their distance from the workpiece, the system operates to lower the tool and sensors.

With the diaphragms 102 and 104 adjusted for minimum stretching, it is advisable to adjust the location of the buttons 114 and 118 with spacing $x_1$ between the thrust plate 106 and the button 114 and spacing $x_2$ between the thrust plate 108 and the button 118, so that each diaphragm must be stretched before the adjacent switch is triggered. Preferably, the spacings $x_1$ and $x_2$ should be made equal. By means of these spacings a dead band of pressures is created such that, when the diaphragms are in neutral position, with or without equal pressure on both sides of the diaphragm cavities, neither switch 112 nor switch 116 is actuated to its closed position. By virtue of the dead band, noise in the signal feedback circuit, most noticeable between significant signals, is discriminated against and minimized and the transducer 101, because it is substantially always either on or off, serves to convert analog feedback input signals into quantized output signals.

Several advantages accrue from the provision of such a dead band. One advantage lies in the rejection of noise signals which are generally interspersed between desired fluidic signals, in that the noise signals are damped out by the spring properties of the respective diaphragms without triggering either of the switches. In this way, faulty triggering of the motor by noise pulses in the signal is reduced or avoided altogether.

Another advantage accruing from the provision of the dead band lies in the reduction or prevention of oscillations or hunting in the control system. There is a range of tool heights about the average equilibrium height in which the motor 24 does not run. If the upper limit of height in this range is exceeded, the switch 116 is closed and the motor 24 is energized in the direction of rotation to lower the tool. On the other hand, if the tool approaches closer to the workpiece than the lower limit of the permitted range of heights, the switch 112 is closed and the motor is energized to raise the tool. If it were not for the dead band, the motor would continually move the tool alternately too high and too low, overshooting the average equilibrium point.

The diaphragms 102, 104 are preferably of the same thickness and the same stiffness, and the assembly is preferably arranged so that the differential pressure is applied symmetrically across the pair of diaphragm cavities. This will facilitate the replacement of the transducer 101 in case of failure thereof without the need to readjust other portions of the system.

The design of the transducer 101 is such that failure of an electrical switch 112 or 116 or failure of the gas power supply will not cause the motor 24 to be actuated.

FIG. 2 shows approximate operating characteristic curves for the push-pull detector comprising the turbulence amplifiers 70, 72, 74, in which curves the abscissae are input pressures and the ordinates are output pressures. The input pressure is a composite of the individual pressures applied through the tubes 76, 78, 80 to the turbulence amplifier 70. The curve 282 represents the output pressure which results in the tube 82 while the curve 286 represents the output pressure which results in the tube 86. The curves 282 and 286 cross at an equilibrium point 240, which equilibrium occurs at a certain composite input pressure represented by a vertical line 242.

FIG. 3 shows approximate operating characteristic curves for the sensors 26, 28, 30. The abscissae are composite output pressures from one or more of the sensors as applied to the turbulence amplifier 70 through the tubes 76, 78, 80, and the ordinates are heights of the tool 20, more specifically the spacing between the tool 20 and the surface of the workpiece 22. Curve 201 shows the relationship between output pressure and height when only one of the sensors is over the workpiece, the other two sensors then contributing no material increment of pressure to the turbulence amplifier. Curve 202 shows the relationship between height and the composite output pressure from two sensors over the workpiece, the third sensor contributing no material pressure. The two active sensors may or may not be contributing equally to the composite output pressure, and it will be evident that if one sensor is closer to the workpiece surface than the other, the closer sensor will contribute a higher proportion of the composite pressure, thus tending to assure that the tool will be raised if any sensor approaches closer to the workpiece than the others. Curve 203 shows the relationship between height and the composite output pressure from three sensors over the workpiece, and here again the sensor closest to the workpiece will have a dominant effect in raising the tool in the case of a too close approach to the surface of the workpiece.

The scale of abscissae in both FIG. 2 and FIG. 3 is the same and the two FIGS. are aligned vertically so that the output pressure from the sensors as shown in FIG. 3 is the input pressure to the turbulence amplifier as shown in FIG. 2. The vertical line 242 represents the equilibrium pressure in the push-pull detecting device comprising the turbulence amplifiers 70, 72, 74, and this line extends through both FIGS.

The operation of the push-pull detecting device will now be described with reference to FIGS. 2 and 3. Assuming that the system is not at equilibrium and that the tool is closer to the workpiece than the normal height which corresponds to the equilibrium condition, and assuming that three sensors are over the workpiece, then the point 223 is a typical point on the curve 203. The composite output pressure from the sensors is represented by the vertical line 244, which intersects the curve 282 in FIG. 2 at a point 232 and the curve 286 at a point 236.

The resulting differential output pressure $\Delta p_1$ measured between the points 232 and 236 is first amplified by amplifier 88, then quantized by transducer 101, and finally used to drive the motor 24 to raise the tool. The raising continues, with decreasing differential pressure until the nearest limit of the dead band of the transducer 101 is reached, at which time the composite output pressure from the sensors is determined by the distance on the vertical line 250 in FIG. 2 between points 252 and 254. This differential pressure is insufficient to keep the switch 112 closed. Thus the motor 24 stops, leaving the tool at the average height indicated by a point 256. If it happens that only two sensors are over the workpiece when the motor stops, the average tool height is slightly less, as shown at point 258 on curve 202, and if only one sensor is over the workpiece, the average tool height is still lower, as shown at point 260 on curve 201. It will be evident that if the tool instead of being below normal height is at any time above normal height, the system will return to the nearest limit of the dead band by lowering the tool.

The dead band in terms of tool height is indicated by the vertical distance between the points 260 and 262 and the corresponding dead band in terms of the input pressures to the transducer 101 appears as the pressure differential between the vertical lines 250 and 268. The equivalent dead band in terms of output pressures from the transducer 101 is shown by the vertical pressure differential between the points 252 and 254 or between the points 264 and 266.

FIG. 4 shows an illustrative relationship between the torque of the motor 24 and the height of the tool above the workpiece. The desired height of the tool is assumed to be three-sixteenths inch, which is typical. Within the dead band of heights above and below three-sixteenths inch, the motor is disconnected and there is no torque exerted by the motor. At a tool height corresponding to the fluidic pressure required to operate the switch 112, it is desired that the motor immediately apply its full torque to raise the tool, the ideal torque versus height characteristic curve being an upward step 400 to a torque value indicated by the horizontal line 402. In the practical case, the torque increases gradually as represented by a broken line 404 while the tool may be falling further and is then reversed and raised. Correspondingly, at a tool height at which the switch 116 is operated, the motor develops a torque in the reverse direction of rotation to lower the tool. The ideal application of the torque is a downward step 406 to a torque value indicated by the horizontal line 408, while the torque in the practical case follows a curve 410. With proper adjustment of the control system, the tool height can be kept within a dead band range of one-sixteenth inch centered at the average equilibrium height, shown as three-sixteenths inch in FIG. 4. For clarity, in FIGS. 2 and 3, the height and pressure dead bands are shown somewhat exaggerated in width.

All the pressurized gas streams required in the entire system can be supplied from a single pressure reservoir if desired, and it is so shown in the drawing. In FIG. 1 the reservoir 134 is shown connected to gas lines 136 and 138 through a constant pressure regulator 140 and monitored by a pressure guage 142. The line 136 supplies gas to the manifold 64. The line 138 is connected through a filter 144 and a constant pressure regulator 146 to a bank of pressure-reducing valves 148, 150, 152, 154, monitored by a pressure guage 156. The pressure-reducing valves are adjustable to provide optimum input pressure for each of the fluidic devices 70, 72, 74, 88.

The fluidic devices 70, 72, 74, 88, and the transducer 101 individual to a given tool in a multiple-tool assembly may advantageously be placed in a control box the limits of which are indicated by a broken line 290 in FIG. 1.

I have found that the principal fluidic connections for the control system can be made through a manifold block as small as 3⅞ inch by 2½ inch by ⅝ inch having 22 drilled holes. The connections in this block include the following: from the regulator 146 to the fluidic devices 70, 72, 74, 88, including needle valves providing the respective functions of the pressure reducing valves 148, 150, 152, 154, with a port for inserting the pressure guage 156; from the regulator 140 to the sensor manifold 64 with a port for inserting the pressure guage 142; and the connections from each sensor to the respective signal input ports in the turbulence amplifiers 70 and 72. The small size of this manifold block and the relative locations of the various drill holes make it possible to place a manifold block inside, outside, or on, the control box 290, and to place side by side a number of sets, each set comprising a control box and a manifold serving a different one of a plurality of cutting torches. In turn, the cutting torches can be placed close together so that a plurality of identical small parts can be cut simultaneously from a sheet of metal with a minimum of waste metal.

With the manifold located outside or on the control box, the supply pressure of the various active fluidic elements can be easily measured with a guage and the supply pressure setting of various fluidic elements adjusted by turning appropriate needle valves.

Referring now to FIGS. 5, 6 and 7, there are shown a torch head 500 and a torch tip 502 connected thereto by a nut 504 making a frictional engagement with the tip and a threaded engagement with the head. In FIGS. 5 and 7, the nut 504 encloses a resilient bushing 506, which is preferably made of silicone rubber, and which permits a slight deflection of the tip, as illustrated in FIG. 7, so that the tip can pass by a small obstruction as at 508, for example, a piece of slag deposited upon the workpiece 22 during a cutting operation.

The head 500 is pierced by a transverse hole 510 which serves as a pressure supply port for compressed air or other gaseous medium, supplied in this case through the manifold 64 which is preferably ring-shaped and passes through the hole 510 in each of three heads (one for each of the sensors 26, 28, 30). The hole 510 opens into a slant hole 512 which connects in turn with an annular passage or manifold 514 in the face of the head that adjoins the tip member 502.

Four spaced holes 516 pass the length of the tip 502 being substantially parallel to the surface of the tip member and converging slightly in the outlet portion of the tip.

In the use of the head and tip assembly as a sensor, the fluid streams emerging from the holes 516 are reflected upward upon striking the surface of tee workpiece 22 as indicated by arrows 518 in FIG. 5 and forced to rise up in the central hole 520, which latter hole registers with a central hole 522 in the head 500, to which hole the tube 76 is connected as shown in FIGS. 5 and 7. Similar sensors are provided to which are connected respectively the tubes 78 and 80. When the head 500 is used as part of a cutting torch, the holes 520 and 522 serve as inlet ports for supplying cutting oxygen to the torch. Also, in the cutting torch, the nut 504 may rigidly connect the head and tip, as the need for resilience in the connection is usually absent. To seal off the central passageway from the peripheral passageways, an O-ring 524 can be inserted as shown between the head and tip members.

When the tip 502 strikes an obstruction, it can deflect as shown in FIG. 7, and if the obstruction is not too great and is sufficiently smooth, the tip can slide over the obstruction without injury. Should the obstruction be large or so shaped as to snag the tip, as for example a sharp-cornered mass 508 of slag, it is desireable that the control system be brought into immediate action to raise the sensor and free it from its snagged involvement. This is accomplished by means of the resilient bushing in the nut 504, which in permitting the tip to deflect also breaks the seal made by the O-ring 524, allowing high pressure fluid from the manifold 514 to enter directly into the central hole 522, thereby immediately raising the pressure in tube 76 and causing the motor 24 to move to raise the tool and sensor assembly out of danger. Upon freeing the tip 502, the latter snaps back into place, reestablishing the seal at the O-ring 524 and reducing greatly the pressure in tube 76, inasmuch as the tip 502 is now farther than normal above the surface of the workpiece. Because of the reduced pressure in tube 76 the control system now acts to lower the tool and sensors to the equilibrium position.

While illustrative forms of apparatus and methods in accordance with the invention have been described and shown herein, it will be understood that numerous changes may be made without departing from the general principles and scope of the invention.

I claim:

1. An apparatus for controlling the spacing between a tool and a workpiece comprising, A sensor means in fixed relation to said tool, said sensor means including peripheral hole means for directing a fluid stream toward said workpiece and axial hole means positioned to receive said fluid stream after being reflected by the workpiece, control means responsive to the pressure of the reflected stream received by said axial hole means to produce a control signal, and space-adjusting means connected to said tool and control means whereby the tool can be moved toward or away from the workpiece in response to the control signal thereby controlling the spacing between said tool and workpiece.

2. A system in accordance with claim 1, in which the tool operates at a temperature deleterious to the operation of available electric or electronic devices, together with tubular pressure-transmitting means leading from said sensor to a location remote from the tool and fluidic apparatus at said latter location to which said tubular means is connected, said fluidic apparatus being comprised within said pressure-responsive space adjusting means, whereby the deleterious effect of the operating temperature of the tool upon the operation of the system is minimized.

3. A system in accordance with claim 1, in which said space-adjusting means comprises reversible driving means for moving the tool with respect to the workpiece, a push-pull pressure operable diaphragm device for controlling said driving means to energize the same and to determine the direction of motion thereof, means to generate a push-pull pressure signal for operating said diaphragm device, said generating means comprising fluidic inverter means and first and second fluidic OR means, means to impress an input signal upon said first and second OR means, said first OR means generating an output signal in one sense, said second OR means connected to said inverter means to generate an output signal in the opposite sense, thereby to provide push-pull pressures to actuate said diaphragm device.

4. A system in accordance with claim 1, in which said sensor means are normally movable as a unit with the tool when changing the tool and workpiece spacing, together with means to produce relative motion of said tool and said sensor means.

5. A system in accordance with claim 1, together with resilient mounting means for said sensor means whereby the sensor can deflect when striking an obstruction,
and means operable when said sensor is deflected to direct said stream of fluid from said stream-directing means into said stream-receiving means without reflection,
whereby the received stream indicates a too close proximity of the tool and workpiece, enabling the control system to withdraw the sensor from contact with said obstruction.

6. A system in accordance with claim 5, in which the said resilient mounting means is effective to restore the said sensor to normal operation upon being withdrawn from contact with said obstruction.

7. A system in accordance with claim 1, in which there are exactly four peripheral holes.

8. A system in accordance with claim 1, in which the said peripheral holes are so directed as to cause the said streams of fluid to converge upon the workpiece surface substantially opposite the said axial hole.

9. An apparatus in accordance with claim 1 wherein said sensor means comprises a plurality of individual sensors spaced about said tool.

10. An apparatus in accordance with claim 9, wherein said control means comprises two fluidic OR means each having at least one input for each said sensor means, said inputs on each OR means connected to one of said sensors, the output of one OR means connected to a fluidic-to-electric transducer means,
the output of the second OR means connected to a fluidic inverter which has an output which is in turn connected to said transducer, and said transducer responsive to the two input signals to produce said control signal.

11. An apparatus in accordance with claim 9, wherein the output of each of said fluidic OR means is substantially the same whether there is a signal on one of its inputs or all of its inputs and the output is predominantly determined by the input of greatest magnitude.

12. A system in accordance with claim 10, in which said fluidic-to-electric transducer comprises a pair of fluid actuated diaphragms, and means mechanically coupling said diaphragms.

13. A system in accordance with claim 9, together with a pressure manifold in the form of a ring arranged to pass through said sensor means to supply fluid at operating pressure in common to said sensors.

14. A system in accordance with claim 10, together with a unitary fluid pressure supply manifold in the form of a perforated block of metal, said manifold comprising inlet means to receive fluid at pressure in excess of operating pressure,
means to reduce fluid pressure in a plurality of stages,
means to adjust pressure supplies to individual fluidic devices in said system,
and means to measure fluid pressure at selected points within said block.

15. A system in accordance with claim 12, in which said fluidic-to-electric transducer comprises a mechanically operable electric switch mounted adjacent to, but spaced from, one of said diaphragms in position to be operated by displacement of said diaphragm, whereby said spacing provides a dead band for said switch with respect to said diaphragm, thereby to minimize false operation of said switch by noise pulses in said diaphragm.